(12) United States Patent
Adams et al.

(10) Patent No.: US 10,579,820 B2
(45) Date of Patent: Mar. 3, 2020

(54) VERIFIED PRIVACY MODE DEVICES

(71) Applicant: BlackBerry Limited, Waterloo (CA)

(72) Inventors: Neil Patrick Adams, Waterloo (CA);
Steven Wellington, Kanata (CA);
Roger Paul Bowman, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 381 days.

(21) Appl. No.: 15/374,583

(22) Filed: Dec. 9, 2016

(65) Prior Publication Data

US 2018/0165472 A1 Jun. 14, 2018

(51) Int. Cl.
G06F 7/04 (2006.01)
G06F 21/62 (2013.01)
G06F 13/42 (2006.01)
G06F 21/60 (2013.01)

(52) U.S. Cl.
CPC ...... G06F 21/6245 (2013.01); G06F 13/4282 (2013.01); G06F 21/602 (2013.01)

(58) Field of Classification Search
USPC .......................................................... 726/27
See application file for complete search history.

(56) References Cited

U.S. PATENT DOCUMENTS

| | | | | |
|---|---|---|---|---|
| 5,355,414 A | * | 10/1994 | Hale | G06F 21/31 708/135 |
| 8,090,961 B2 | | 1/2012 | Yoffe et al. | |
| 8,522,309 B2 | | 8/2013 | Yoffe et al. | |
| 9,158,496 B2 | * | 10/2015 | Soffer | G06F 21/83 |
| 9,672,173 B2 | * | 6/2017 | Tsirkin | G06F 13/24 |
| 10,108,310 B2 | * | 10/2018 | Chen | G06F 3/04817 |
| 10,169,265 B2 | * | 1/2019 | Wang | G06F 13/20 |
| 2004/0021636 A1 | * | 2/2004 | Venn | G06F 3/03543 345/163 |

(Continued)

FOREIGN PATENT DOCUMENTS

EP 3333753 A1 6/2018

OTHER PUBLICATIONS

Extended Search Report issued for corresponding European Patent Application No. 17204166.7 dated Feb. 2, 2018.

(Continued)

*Primary Examiner* — Amare F Tabor
(74) *Attorney, Agent, or Firm* — Jeffrey N. Giunta; Fleit Intellectual Property Law

(57) ABSTRACT

A system and method for a privacy mode are disclosed. A trusted execution environment and general operating system that has restricted access to the trusted execution environment are maintained on a processor. A privacy mode command indicating either one of a first value and a second value is received. A peripheral control interface, which is communicatively coupled to the trusted execution environment and otherwise communicatively isolated from the general operating system, is disabled when the privacy mode enable indicator has the first value and is enabled when the privacy mode enable indicator has the second value. An associated peripheral is disabled from providing signals to processing circuits when the peripheral control interface is in the disabled state and enabled to provide signals to processing circuits when the peripheral control interface is in the enabled state.

18 Claims, 8 Drawing Sheets

(56) References Cited

U.S. PATENT DOCUMENTS

| | | | | |
|---|---|---|---|---|
| 2014/0075496 A1* | 3/2014 | Prakash | .............. | G06F 21/6218 |
| | | | | 726/1 |
| 2015/0040242 A1* | 2/2015 | Bar-On | ............... | G06F 21/6245 |
| | | | | 726/26 |
| 2015/0248566 A1* | 9/2015 | Scott-Nash | ......... | G06F 21/6245 |
| | | | | 726/26 |
| 2016/0308677 A1* | 10/2016 | Thom | ................... | H04L 9/3234 |

OTHER PUBLICATIONS

Globalplatform, "The Trusted Execution Environment: Delivering Enhanced Security at a Lower Cost to the Mobile Market", White Paper, Jun. 2015, revised from Feb. 2011, downloaded from https://www.globalplatform.org/home.asp, pp. 1-37.

Gemalto, "Product Brief—SafeNet eToken 5110", 2015, pp. 1-2.

Notification of European Publication Number for European Patent Application No. 17204166.7 dated May 16, 2018.

\* cited by examiner

VERIFIED PRIVACY MODE DEVICES

FIELD OF THE DISCLOSURE

The present disclosure generally relates to electronic device operations, and more particularly to reliably disabling sub-components of an electronic device.

BACKGROUND

Electronic devices, such as smartphones, computers, and the like, include sensors such as microphones and cameras. Inadvertent or unauthorized activation of these sensors may be a concern in some environments, particularly if privacy or security is a concern. Many electronic devices include facilities for disabling these sensors, but these facilities may be subject to unauthorized circumvention. In some examples, an unauthorized activation of sensors such as microphones or cameras on an electronic device can occur without the knowledge of the user of the device.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
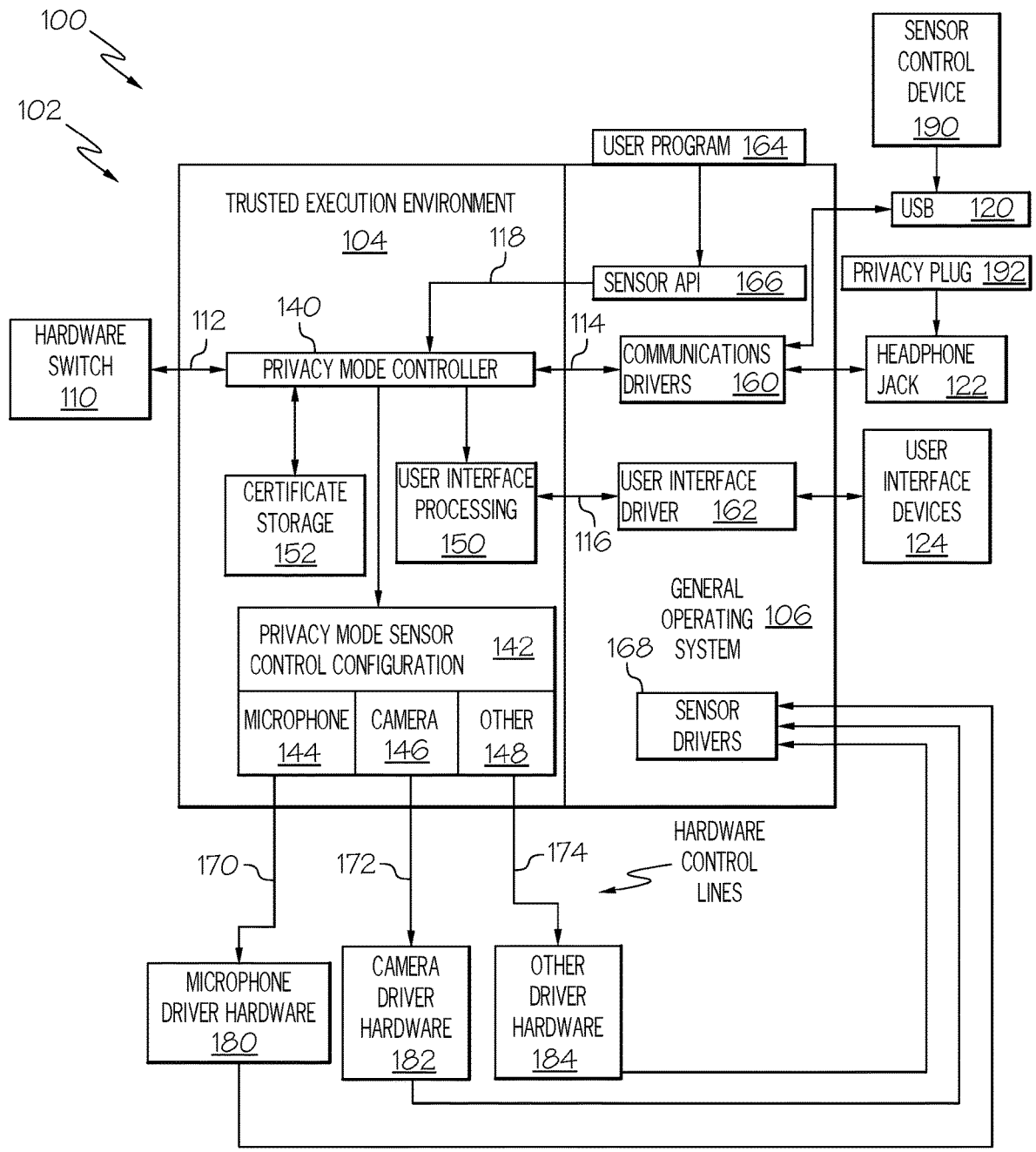
FIG. 1 illustrates an electronic device with privacy mode, according to an example.

Detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to improve a user's privacy, security, and other operational characteristics by providing a user with secured and verified control over sensors that are part of or that operate with a device. In an example, an electronic device, such as a smartphone, tablet, other computing device, other electronic device, or combinations of these, include one or more of a microphone, camera, proximity sensor, light sensor, accelerometer, gyroscope, barometer, thermometer, other sensor, other components, or combinations of these. In various examples, the electronic devices are able to include electronic devices installed in fixed location, electronic devices that are portable, electronic devices suitable for installation in vehicles including, but not limited to, motor vehicles (e.g., cars), aircraft, spacecraft, watercraft, railed vehicles, other vehicles, other types of electronic devices, or combinations of these. The below systems and methods allow a user to disable one or more of these devices in a manner that provides secure and verified feedback that confirms that these devices have indeed been disabled and are not able to provide input to programs or other components of the electronic device.

The following examples describe the disabling and enabling of sensors, such as microphones and cameras, that are controlled or operated by an electronic device. It is clear that the below described systems and methods are able to be easily applied to controlling other electronic device peripherals such as, without limitation, GPS receivers or location reporting, Near Field Communications (NFC) devices, Bluetooth interfaces, other peripherals, or combinations of these.

The following examples describe systems and methods that include a computer processor that supports a trusted execution environment. A trusted execution environment in an example is an environment that restricts the ability to modify and access program code and data that is executed by and accessible to the trusted execution environment. An example of a trusted execution environment is implemented as the ARM® Trustzone® technology as defined by ARM Limited. A trusted execution environment generally operates along with, but is separated from, a conventional operating system that is operating on the same processor, a connected processor, or both. The trusted execution environment in an example has access to memory, hardware input/output signals, and other facilities that are not available to a conventional operating system that is operating on the same processor or connected processor.

In some examples, hardware interfaces are able to be defined that are exclusively accessible to the trusted execution environment and that are not available to other processes such as processes executing in the general operating system of the processor. These hardware interfaces include hardware control interfaces of electronic circuits that enable or disable particular peripherals, such as sensors including microphones, cameras, other devices, or combinations of these. Because the hardware control interfaces are not accessible to the general operating system, control to enable or disable those sensors is limited to processes that execute within the trusted execution environment. Because these processes in the trusted execution environment are not able to be altered by conventional processing, the control of these peripherals is able to be better trusted.

In an example, a device may have a physical switch that is able to place the device into its privacy mode. In its privacy mode, selected peripherals, such as selected sensors including one or both of microphones and cameras, are disabled. This physical switch in an example is electrically connected to an input control line that is only accessible to the trusted execution environment. Changing the position of this physical switch in an example drives an input to the trusted execution environment that triggers an event to cause processing to enable or disable the privacy mode of the device based on the position of that physical switch. Alternatively, the trusted execution environment is able to check the state of the switch when particular functions, such as activating a set of specified sensors or other peripherals, is requested to be performed. The physical switch is also able to be polled at various times to ensure that the specified peripherals are properly disabled based on the position of the switch. In an example, such a physical switch is referred to as a privacy switch. When the privacy switch is in a position that indicates certain peripherals, such as certain sensors, are to be disabled, the device is said to be in a privacy mode and the specified sensors are disabled. In an example, a user of the electronic device is able to look at the position of the privacy switch to readily determine if the privacy mode of the electronic device is enabled or disabled, and thus if specified sensors are positively disabled.

As an alternative to the above described physical switch, a privacy device may be coupled to a communications connector of the electronic device with peripherals, such as sensors, that are to be disabled or otherwise controlled. Connecting a privacy device to the communications connector in an example causes the electronic device to enable its privacy mode and thus disable specified peripherals, such as sensors. In various examples, a privacy device is able to connect into any suitable communications connector, such as a Universal Serial Bus (USB) connector, an audio connector, any other connector, or combinations of these. In further examples, the communications connector is able to include a wireless communications link, such as a Bluetooth® link, and coupling to such a communications connector is able to include establishing a wireless communications link over any suitable protocol.

The below described systems and methods describe two examples of privacy devices. One example privacy device is referred to as a privacy plug and another privacy device is referred to as a sensor control device. It is clear that further variations of privacy devices are able to be used in within the teachings of the following description. In the below description, privacy devices including both the privacy plug and the sensor control device are plugged into a communications connector of an electronic device and communicate with processes in the trusted execution environment of that electronic device to cause processes in the trusted execution environment to enable or disable the privacy mode of the device. Both the privacy plug and sensor control device are able to operate to provide a verified indication that the electronic device has enabled its privacy mode. As is described in further detail below, the sensor control device is generally able to perform additional functions as compared to the functions performed by the privacy plug beyond commanding and verifying the enablement of the privacy mode of the electronic device.

In an example, the communications link is able to include an audio jack, such as a standard 3.5 mm audio jack. A privacy device that plugs into an audio jack in an example does not contain a microphone and is detectable by, for example, particular characteristics presented on the audio lines of the 3.5 mm audio jack. For example, particular impedances are able to be presented on the microphone and left/right stereo channels. Alternatively, a repeating signal is able to be presented on those audio lines such as a fixed sequence of headset button presses. In an example, the privacy device is able to be relatively small and extends just far enough so that it can be grasped and removed. A privacy device in an example has low power consumption and has an LED. In the case of a communications connector that is a 3.5 mm audio jack, the privacy device is able to be designed to drawn sufficiently low power levels so as to allow it to be powered by a microphone bias signal provided by the audio jack. In further examples, a small battery or other power source may be included to provide power during increased power demands. In an example, the brightness and blinking duty cycle of an indicator LED can be chosen to allow the microphone bias current to properly supply the demands of the privacy device. In some examples, the privacy device is able to securely store a cryptographic key and perform cryptographic operations.

Privacy devices in some examples are implemented as USB peripherals. In this case, USB protocol is able to identify the type of device that is inserted into a USB port. When a privacy device in the form of a USB peripheral is inserted into a USB port, it is identified and the host processor of the device into which the privacy device is inserted is directed to perform processing associated with the identified privacy device. For example, different processing may be performed in response to identifying different types of privacy devices, such as a privacy plug or sensor control device. In the case of a USB device, the privacy device may receive power via the USB interface as well.

As is described in further detail below, various processing is able to be performed by the host processor in response to insertion of a privacy device. In general, insertion of a privacy device into a communications connector of a device causes that device to enter into a privacy mode. As discussed above, privacy mode is also able to be entered by use of a hardware switch. In an example, a privacy device is able to include an indicator, such as an LED, other visual indictor, audible indicator, other indicator, or combinations of these, that confirm that the device has successfully entered its privacy mode. In an example, the privacy device communicates with secure and trusted application software in the trusted execution environment to verify that the device has been successfully configured into its privacy mode. As is described below, verification is achieved in some examples with the aid of cryptographic verification techniques between the trusted execution environment and the privacy device.

In an example, the state of peripherals that are disabled or otherwise placed in particular states when the device is placed into its privacy mode is able to be configured by various techniques. In some examples, the particular states for various peripherals when the privacy mode is enabled is set by security policies, other configuration mechanisms, or combinations of these. In an example, the privacy device is able to specify the state of various device functions while the privacy mode is enabled, such as disabling one or more of all microphones or cameras. In an example, a secure user interface may be provided to allow configuring what happens, such as which devices are to be disabled, when the device is in its privacy mode. In an example, the trusted execution environment is able to provide processing to drive this user interface and receive inputs to configure these various states.

In an example, the trusted execution environment is also able to provide an output on the electronic device, such as illuminating a dedicated secure LED that is only accessible to the trusted execution environment, while providing this user interface to allow configuration of privacy mode configurations. This provides assurances that this user interface is being provided legitimately and not, for example, by unauthorized software. In some examples, the user interface supports choosing to enable/disable a device's microphone, camera, or both.

When the device is in its privacy mode, the trusted execution environment disables any hardware according to the settings previously configured via the user interface. When the privacy mode is terminated, by various techniques as are described below, the trusted execution environment makes the appropriate changes to the hardware configurations. In some examples, the trusted execution environment provides a notification to the general operating system of the device so that the present privacy mode state can be reflected appropriately by the general user interface, indicated to processes executing in the general operating system, for other purposes, or combinations of these.

In an example, existing software Application Program Interfaces (APIs) that turn on/off peripherals that may be restricted when the privacy mode is enabled, such as APIs to control or use microphones and cameras, are modified to be routed through the trusted execution environment. When a peripheral, such as a microphone or camera, is in use at the time that the privacy mode for the electronic device is enabled, that peripheral is disabled according to the configuration of the privacy mode for that device when the privacy mode is entered. All application permissions for such peripherals are revoked in an example. Applications designed with knowledge of privacy mode operations in an example are able to register for notification of activation of the privacy mode event to facilitate graceful handling of the shutdown of peripherals. In an example, applications not designed specifically to support privacy mode will behave as though the user has revoked permission for that peripheral when the privacy mode is enabled.

The status of various peripherals when privacy mode is enabled is able to be indicated by various techniques. For example, an LED that is controlled by the trusted execution environment is able to flash different colors depending on which hardware components are currently enabled even though the privacy mode is enabled. For example, an LED is able to be configured to flash blue for Bluetooth, green for camera, and alternating between colors if multiple components are enabled.

In an example, a privacy device is inserted into a communications connector of an electronic device with a host processor that includes a trusted execution environment. Upon detection of this insertion, the trusted execution environment sends a cryptographic certificate to the privacy device. The privacy device in an example verifies the certificate chain to confirm the certificate is received from a properly configured trusted execution environment within an expected electronic device. The privacy device in an example then sends a request to the trusted execution environment to turn off specified peripherals, such as one or more of a camera and microphone. In an example, the request is conveyed through a communications connector, such as the audio jack or the USB port of the electronic device, and the associated communications driver in the general operating system of the host processor forwards this request to the trusted execution environment. The trusted execution environment then performs the command and disables the specified peripherals. The trusted execution environment then signs a response that indicates the specified peripherals have been disabled. The signed response is sent to the privacy device and the privacy device verifies the signature. Upon verification of the signature, an indicator on the privacy device in one example, such as an LED, is illuminated in a particular color, such as green, to indicate successful enablement of privacy mode in the device. If no response is received, or the signature of the response is not verified, the indicator in an example is illuminated in another color, such as red, or not illuminated at all.

In an example, a sensor control device is able to include functionality to allow the privacy mode of an electronic device to be enabled and the privacy mode is maintained after the sensor control device is removed. In an example, such a sensor control device is able to be possessed and used by a security guard for a secure area. This security guard inserts this sensor control device into all electronic devices entering the secure area in order to enable their privacy mode. In an example, once an electronic device is in its privacy mode, its privacy mode can only be disabled by again inserting a sensor control device. In a further example, in addition to disabling privacy mode by again inserting the sensor control device, some examples automatically disable the privacy mode of the device after a specified time interval elapses following enablement of the privacy mode by inserting the sensor control device, such as by a security guard. In such examples, trusted sources of time, e.g., time that read from a remote device or time that is maintained by a timer that cannot be modified, may be used to determine that the specified time interval has elapsed.

In an example, the sensor security device sends identification information, such as a public key used to encrypt the commands it sends to the electronic device, to the trusted execution environment of the electronic device. The process in the trusted execution environment that receives this identification information securely stores that identification information. The process in the trusted execution environment in such an example only responds to requests to disable the privacy mode that are sent from the same sensor control device. In an example, the process only responds to requests to disable the privacy mode that contain identifying data that corresponds to the identification data received with the request to enable the privacy mode. In another example, the trusted execution environment can disable privacy mode upon authenticated requests from sensor control devices authorized to manage privacy mode for a specific organization or facility. In order to support decryption of data received from the sensor security device, authentication of the sensor security device, or both, by the trusted execution environment, any suitable technique is able to be used to provide, for example, private keys, certificates, other data, or combinations of these, to the trusted execution environment.

In an example, a privacy device is able to be paired to a particular device implementing a privacy mode. In an example, the trusted execution environment is able to create an asymmetric key pair for this purpose and send the corresponding public key to the privacy device. In an example, this process is performed before any malware is likely to be installed on the device. In an example, this process is able to be performed during manufacturing of the device and privacy device if the privacy device is to be shipped with the device. In another example, this process is able to be performed during an initial startup of the device before any applications are installed. Such a process is able to be performed using a bootROM utility that allows for configuration of device components before the main OS is started. In an example of such a process, the privacy device is able to be inserted and the electronic device is reset. The bootROM in such an example detects the privacy device before the OS starts and checks to ensure the keys exist and match. If the keys do not exist or if the keys don't match, a new asymmetric key pair is created and the privacy device is initialized with the public key of that key pair. In alternative examples, one or both asymmetric keys are able to be communicated directly with the trusted execution environment in a suitably encrypted form.

In an example, the communications between a privacy device and the processes within the trusted execution environment are conveyed through communications drivers operating within the general operating system of the electronic device. These drivers are subject to unauthorized modification that can interfere with the desired communications between the privacy device and the trusted execution environment. In an example, an unauthorized modification to these communications drivers may redirect communications with the privacy device to, for example, a trusted execution environment of a different electronic device. Such redirection may be through, for example, wireless data communications between the device into which the privacy device is plugged and that different electronic device. In this scenario, the trusted execution environment of the electronic device into which the privacy device is plugged will not interact with the privacy device at all. In an example, such redirection may cause the valid enablement of privacy mode on that remote electronic device and that remote electronic device will send a valid response to the privacy device confirming enablement of the privacy mode, but the privacy mode on the electronic device into which the privacy device is inserted is not enabled. As such, sensors of the electronic device into which the privacy device is inserted will continue to operate.

In an example, a sensor control device is able to be configured to support additional validation that the privacy mode of the intended electronic device is actually enabled. In an example, the sensor control device contains display data that is to be displayed on the electronic device into which the sensor control device is plugged. Such display data is an example of validation data. This display data is able to consist of any suitable data, such as data defining an image, data defining numeric values, data defining alphanumeric values or characters, any other data, or combinations of these. A user, such as a security guard who will insert the sensor control device into an electronic device to enable its privacy mode, will have knowledge of the definition of this display data and will be able to confirm that the proper data is displayed by the electronic device. Such knowledge is able to be by any technique, such as a print out, computer display, other techniques, or combinations of these. When such a sensor control device is plugged into the electronic device, a representation of this display data is displayed on the electronic device.

In an example, upon insertion of a sensor control device that includes display data to be displayed on the electronic device into which it is inserted, the process in the trusted execution environment performs additional processing. Upon detection that such a sensor control device is inserted into the electronic device, the process in the trusted execution environment sends a certificate associated with the electronic device to the sensor control device. This is an example of sending controller identification data to the privacy device via the data communications connector. The sensor control device then verifies the certificate chain of the certificate it receives to confirm that the certificate is associated with a proper electronic device. If the certificate chain is verified, the sensor control device encrypts the display data using that received certificate. The sensor control device in an example sends to the electronic device both the encrypted display data and a command to enable the privacy mode of the electronic device. A process in the trusted execution environment of the electronic device receives both encrypted display data and the command and decrypts the display data based on the certificate it sent to the sensor control device. The process in the trusted execution environment causes the decrypted display data to be presented on the electronic device. This presentation corresponds to the type of display data conveyed, such as presentation of an image, numeric values, alphanumeric characters, other data, or combinations of these. A user, such as a security guard who inserted the sensor control device into the electronic device, is then able to confirm that the proper data is displayed, and thus verify that the privacy mode has been enabled on the intended electronic device. In an example, the trusted execution environment enforces memory protection to prevent reading of the decrypted display data by unauthorized processes, such as those operating outside the trusted execution environment. Protecting unauthorized processes from reading the decrypted display data enhances the integrity of this authentication process and enhances, for example, the integrity of detecting an unauthorized redirection of communications between the trusted execution environment and the privacy device.

FIG. 1 illustrates an electronic device with privacy mode 100, according to an example. The electronic device with privacy mode 100 is an example of an electronic device that incorporates a privacy mode control apparatus that provides functionality to place the electronic device into a privacy mode where certain peripherals are disabled and inaccessible to processes executing on a processor of the electronic device. In an example, sensors such as microphones, cameras, other sensors, or combination of these are disabled when the device is in its privacy mode. As is described below, privacy mode is able to be enabled or disabled by various techniques. Although this description describes an electronic device that is capable of enabling its privacy mode in various ways, various electronic devices are able to use only one or a subset of these techniques, or are able to use other techniques, to enable and disable their privacy modes.

The electronic device with privacy mode 100 includes a processor 102. The processor 102 supports execution of a general operating system 106. As is known by practitioners of ordinary skill in the relevant arts, a general operating system is able to support execution of a number of user applications, support programs or software processes such as services or daemons, other programs, or combinations of these. In order to simplify the depiction and description of the relevant parts of these examples, the various additional components of a processor, such as memory, interfaces, support logic, other components, or combinations of these, are simply depicted as the processor 102.

The processor 102 in this example further supports a trusted execution environment 104. A trusted execution environment in an example provides an isolated environment where firmware, data, other computational objects, or combinations of these, are stored, accessed, executed, otherwise used or manipulated, or combinations of these. In an example, the trusted execution environment stores data and program code in a manner that prohibits or restricts access by processes executing in the general operating system 106. In an example, processes executing in the trusted execution environment provide protected interfaces that allow processes executing in the general operating system 106 to exchange data or other information, such as instructions to execute functions within the trusted execution environment, with components in the trusted execution environment. Because of this relationship between the trusted execution environment 104 and the general operating system 106, the general operating system 106 is said to have restricted access to the trusted execution environment 104.

In some examples, the trusted execution environment 104 is able to have exclusive access to hardware interfaces. These hardware interfaces are not accessible to other processes executing on the processor 102 that are not within the trusted execution environment 104. These hardware interfaces are able to include, for example, hardware input lines, hardware output lines, memory ranges, other hardware interfaces, or combinations of these. Because processes operating in the general operating system 106 can only access these hardware interfaces by communicating with processes within the trusted execution environment 104, and these processes operating in the general operating system 106 cannot access those hardware interfaces, these hardware interfaces are said to be otherwise communicatively isolated from the general operating system 106. In some examples, the configuration of access controls for hardware interfaces is dynamic, such that the trusted execution environment 104 is able to have exclusive access to these hardware interfaces for constrained use-cases while also being able to assign some of these hardware interfaces to the general operating system 106 when exclusive access is not required.

The trusted execution environment 104 in general contains a number of functions to support operation of the electronic device supported by the processor 102. The electronic device with privacy mode 100 depicts processes and data within the trusted execution environment 104 that support the operation and implementation of the privacy mode of the electronic device. In particular, the illustrated trusted execution environment 104 includes a privacy mode controller 140 that performs the functions associated with enabling, implementing, disabling, other functions, or combinations of these, that are associated with the privacy mode of the electronic device.

In an example, the privacy mode controller 140 operates with various components or separate devices to determine when privacy mode is to be enabled or disabled. In one example, the privacy mode controller 140 has a switch protected interface line 112 connected to a hardware switch 110. In an example, the switch protected interface line 112 is a hardware interface that is only accessible by the trusted execution environment 104. The hardware switch 110 in this example is able to be moved between two positions with one position indicating that privacy mode is enabled, and the other position indication that privacy mode is disable. The illustrated hardware switch is an example of a physical switch that is communicatively coupled to the trusted execution environment 104 and otherwise communicatively isolated from the general operating system 106 where that physical switch provides a privacy mode enable indicator to the trusted execution environment 104. In this example, the privacy mode enable indicator has a first value based on the physical switch being in the first position, and a second value based on the physical switch being in the second position.

In some examples, the privacy mode controller 140 interacts with external hardware devices to perform processing to cause privacy mode to be enabled or disabled as well as provide a reliable indicator that the privacy mode has been actually enabled. The illustrated examples depict two such external hardware devices, a privacy plug 192 and a sensor control device 190.

In the illustrated example, an external privacy plug 192 is able to be plugged into a headphone jack 122 of the electronic device with privacy mode 100. The headphone jack 122 is an example of an audio connector and the plug on the external privacy plug 192 that plugs into the headphone jack 122 is an example of a corresponding connector. The headphone jack 122 in an example provides a connection that allows the trusted execution environment 104 to establish a communications session with the privacy plug 192 via the communications drivers 160. As is described in further detail below, the privacy mode controller 140 in an example is able to exchange data with this privacy plug 192. In an example, the communications drivers 160 are configured to exchange data via the audio signal lines of the headphone jack 122. Such data may be encoded as audio, other analog signaling, digital signaling, or a combination of these. The headphone jack 122 is also configured in an example to provide power to the privacy plug when it is inserted into the headphone jack 122. The privacy mode controller 140 exchanges data with the communications drivers 160 via a protected communications interface 114.

In another of the illustrated examples, an external sensor control device 190 is able to be plugged into a communications connector, such as a USB port 120 of the electronic device with privacy mode 100. A USB plug on the sensor control device 190 is an example of a corresponding connector for the USB port 120. As is described in further detail below, the privacy mode controller 140 in an example is able to establish a communications session with and exchange data with the sensor control device 190 through the communications drivers 160 via a protected communications interface 114. Establishing this communications session with the sensor control device 190 through the USB port 120 is an example of establishing this communications session via a data communications connector. As is described in further detail below, the privacy mode controller 140 is able to perform a number of operations in conjunction with the sensor control device 190 to ensure secure and verified enablement and disablement of the protected mode of the electronic device with privacy mode 100.

In some examples, identifying devices to be restricted from use or which devices whose operations may be partially restricted when the privacy mode of the electronic device is enabled are able to be configured. In the illustrated example, the privacy mode sensor control configuration 142 includes privacy mode configuration data to define the operation of various peripheral devices. In the illustrated example, a microphone configuration data 144, a camera configuration data 146, and an other peripheral configuration data 148 are shown. In some examples, the privacy mode sensor control configuration 142 is set by various policies or external control mechanisms. In some examples, a user is able to set the configuration of the privacy mode sensor control configuration 142.

In order to support user configuration of the privacy mode sensor control configuration 142 in an example, the trusted execution environment 104 includes user interface processing 150. The user interface processing 150 executes within the trusted execution environment 104 and defines data to present on, and receives user inputs from, the user interface devices 124. The user interface processing 150 communicates via a protected UI interface 116 with the user interface driver 162 of the general operating system 106. The user interface driver 162 drives the user interface devices 124 to present data to and receive data from a user. The user interface processing 150 defines user interface elements that allow the user to, for example, inspect and modify the contents of the privacy mode sensor control configuration 142 and the data stored in the microphone configuration data 144, the camera configuration data 146, and the other peripheral configuration data 148. In an example, data to be presented to a user is defined by the user interface processing 150 within the trusted execution environment 104 and routed through the user interface driver 162. In some examples, the user interface driver 162 is not able to access or alter the data to be displayed that is stored in the user interface processing 150. In some examples, of the user input facilities, such as input keys, touchscreen sensors, and the like, are able to be routed directly to the trusted execution environment while secure user interface operations are executing in order to inhibit unauthorized alterations of these user interface operations.

When the privacy mode controller 140 enables the privacy mode, the privacy mode sensor control configuration 142 is instructed to disable the sensors or peripheral according to the privacy mode configuration data for that peripheral. For example, if the microphone configuration data 144 indicates the microphone should be disabled, but the camera configuration data indicated that the camera should not be disabled, the microphone is disabled but the camera is not disabled when the privacy mode of the electronic device is enabled.

In an example, the microphone driver hardware 180 has a hardware microphone enable control line 170 that is able to inhibit the microphone's operation. The camera driver hardware 182 similarly has a hardware camera enable control line 172 that is able to inhibit the camera's operation. The other driver hardware 184 also has a hardware other driver enable control line 174 that is able to inhibit the operation of the other hardware. The illustrated microphone driver hardware 180, camera driver hardware 182, and other driver hardware 184 are examples of peripheral control circuits that are configured to control their associated peripherals, such as the microphone, camera, and other peripheral, respectively. The hardware microphone enable control line 170, hardware camera enable control line 172, and the hardware other driver enable control line 174 are examples of peripheral enablement control interfaces for their respective peripheral control circuits.

The hardware control lines for these example peripheral control circuits are settable between an enabled state and a disabled state. In an example, these hardware control lines operate a suitable interface of the peripheral control circuits to enable or disable each device. For example, these hardware control lines are able to enable/disable a voltage regular for a particular peripheral device, enable/disable a load switch associated with a particular peripheral device, drive a transistor or other component that provides power to the microphone, camera, or other hardware, or any combination of these. In an example, setting one of these hardware control lines to its disabled state causes that voltage regulator, load switch, transistor, or combinations of these to remove power from at least a portion of its associated peripheral and thus renders the associated peripheral inoperable. Thus, when the peripheral enablement control interface is in its disabled state, its associated peripheral is disabled from providing signals to processing circuits. When these hardware control lines are in their enabled states, the transistor provides power to the associated peripheral so the associated peripheral can then provide signals to processing circuits. When the peripherals, such as the microphone, camera, or other hardware are enabled, either because privacy mode is disabled, or the particular peripheral is configured to be enabled in privacy mode, output of those peripherals are sent to sensor drivers 168 of the general operating system 106 and are able to be used by conventional programs executing therein. In another example, the hardware control lines drive a reset input to circuitry related to microphone, camera, or other hardware to render the associated peripheral inoperable. In another example, the trusted execution environment 104 revokes access by the general OS 106 to hardware interfaces necessary for the operation of the microphone, camera, or other hardware to render the associated peripheral inoperable. In an example, any one or more of asserting a reset of, de-asserting an enable of, revoking access to, or removing power from, such a peripheral device are examples of performing the above described control of a peripheral device.

In an example, either the privacy plug 192 or the sensor control device 190 provides a privacy mode enable indicator to the trusted execution environment 104 through the above described communications session. The privacy mode enable indicator is able to have two values, with one value indicating that the privacy mode should be enabled and another value indicating that the privacy mode should be disabled. A process within the trusted execution environment 104 sets the appropriate peripheral enablement control interfaces, such as the illustrated hardware control lines, to a disabled state if the privacy mode enable indicator indicates that the privacy mode is to be enabled. That process in the trusted execution environment 104 in an example also sets the appropriate peripheral enablement control interfaces to an enabled state based upon receiving a privacy mode enable indicator indicating that the privacy mode is to be disabled.

A user program 164 is shown as executing in association with the general operating system 106. The user program 164 is able to be a conventional program. In this example, the user program 164 requests to use a sensor, such as the microphone or camera. The user program 164 uses the sensor API 166 of the general operating system 106 to request the use of these sensors.

In an example, the processing associated with sensor Application Program Interface (API) provided by the general operating system 106 for all peripherals whose use might be controlled or restricted when the device is in its privacy mode are modified to support privacy mode operations. In one example, the request to use a sensor is routed from the general operating system 106 to a process within the trusted execution environment 104 through the request interface 118.

Figure 2:
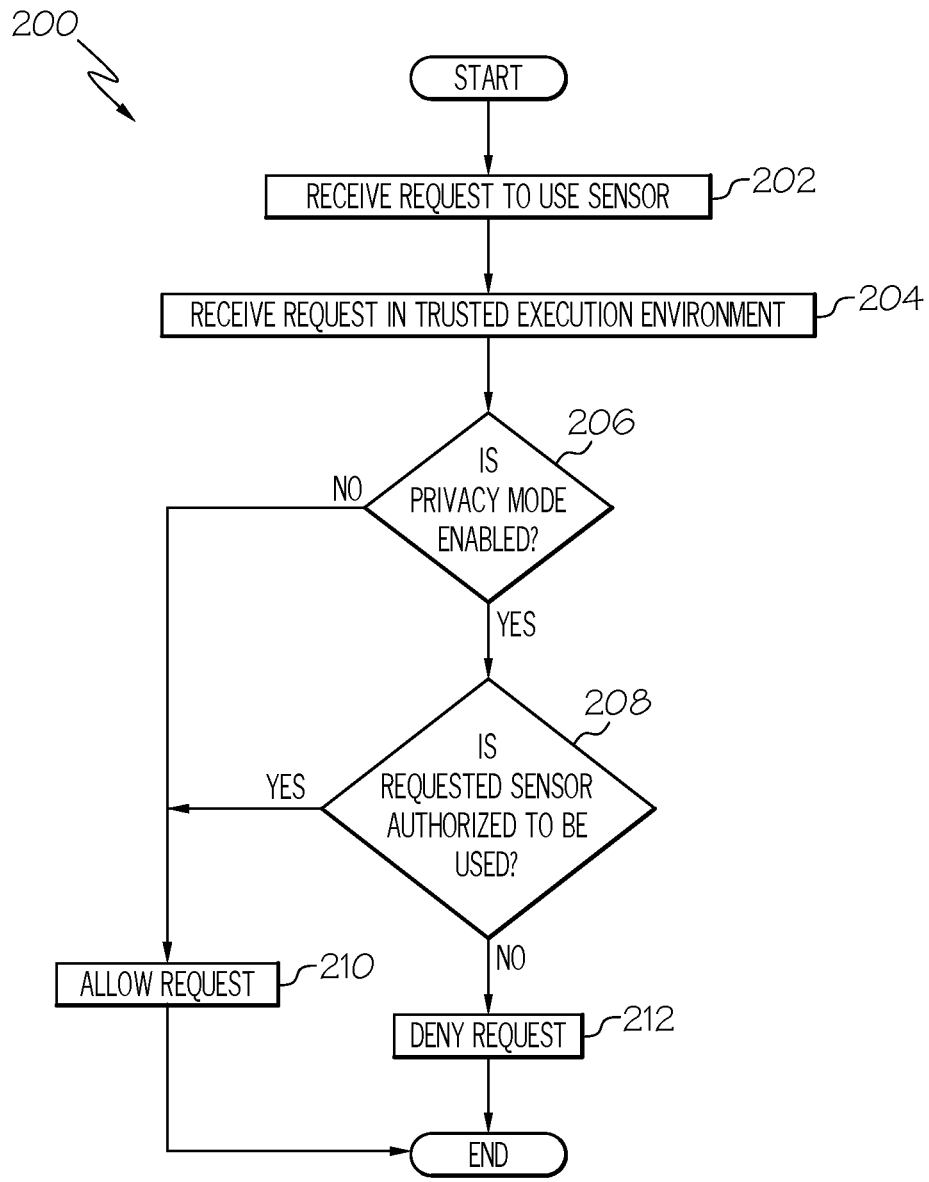
FIG. 2 illustrates a privacy mode sensor request process, according to an example.

FIG. 2 illustrates a privacy mode sensor request process 200, according to an example. The privacy mode sensor request process 200 depicts an example in which an application executing on the processor of an electronic device, such as a process executing in the general operating system 106 described above, requests to use a sensor that is protected by the privacy mode of the device. In the illustrated example, the operating system 106 has been modified so that Application Program Interfaces (API) associated with some peripherals route requests to use those peripherals through the trusted execution environment 104. In the above described electronic device with privacy mode 100, the user program 164 is an example of a process that would request to use a sensor that is potentially restricted in the privacy mode of the device. The user program 164 uses the sensor API 166 of the general operating system 106 to request the use of a sensor. This sensor API 166 has been modified to use a request interface 118 to send that request to the privacy mode controller 140. In this example, as is described below, the sensor API 166 and the privacy mode controller 140 at least partially performs the privacy mode sensor request process 200.

The privacy mode sensor request process 200 begins by receiving, at 202, a request to use a sensor. This request in an example is received by the sensor API 166 described above. In some examples, the APIs in the general operating system 106 for all peripherals whose use might be controlled or restricted when the device is in its privacy mode will have modified APIs similar to the sensor API described herein. In one example, the request to use a sensor is routed from the general operating system 106 to a process within the trusted execution environment 104 through the request interface 118.

The request is received, at 204, in the trusted execution environment. In the above illustrated example, the privacy mode controller 140 receives this request through the request interface 118 of the trusted execution environment.

A determination is made, at 206, as to whether the privacy mode of the device is enabled. Various techniques to enable or disable privacy mode are described in further detail below. In one example, determining whether the privacy mode is enabled is based sensing the position of a hardware switch 110. As described above, the hardware switch 110 is a two position switch that in one position indicates privacy mode is enabled, and in the other position indicates that privacy mode is disabled. The determination at 206 is made in some of those examples by determining, via the switch protected interface line 112, the position of the hardware switch 110. In further examples, as is described in further detail below, the enablement or disablement of the privacy mode of an electronic device is based on inserting privacy devices into communications connectors and associated processing performed at least partially within the trusted execution environment.

Returning to the determination at 206, if it is determined that the privacy mode is not enabled, the request is allowed, at 210. If it is determined that the privacy mode is enabled, a determination is made, at 208, if the requested sensor is authorized to be used when the privacy mode is enabled. As described above, the privacy mode sensor control configuration 142 includes configuration data to identify which peripheral, such as sensors, are to be restricted from use in privacy mode, and which, if any, are able to be used. If it is determined that the requested sensor is authorized to be used, the request is allowed, at 210. If it is determined that the requested sensor is not authorized to be used, the request is denied, at 212. The privacy mode sensor request process 200 then ends.

Various examples of processing associated with different examples of privacy devices are described below. As described above, two examples of privacy devices are a privacy plug and a sensor control device. Although the following description refers to a particular process as being associated with a privacy plug or sensor control device, it is to be understood that processes similar to those described below are able to be associated in some examples with any kind or type of privacy devices. As described above, various types of privacy devices, including privacy plugs and sensor control devices, are able to be inserted into either an audio jack for communications with the electronic device, inserted into another data communications connector such as a USB port for communications with the electronic device, or both.

Figure 3:
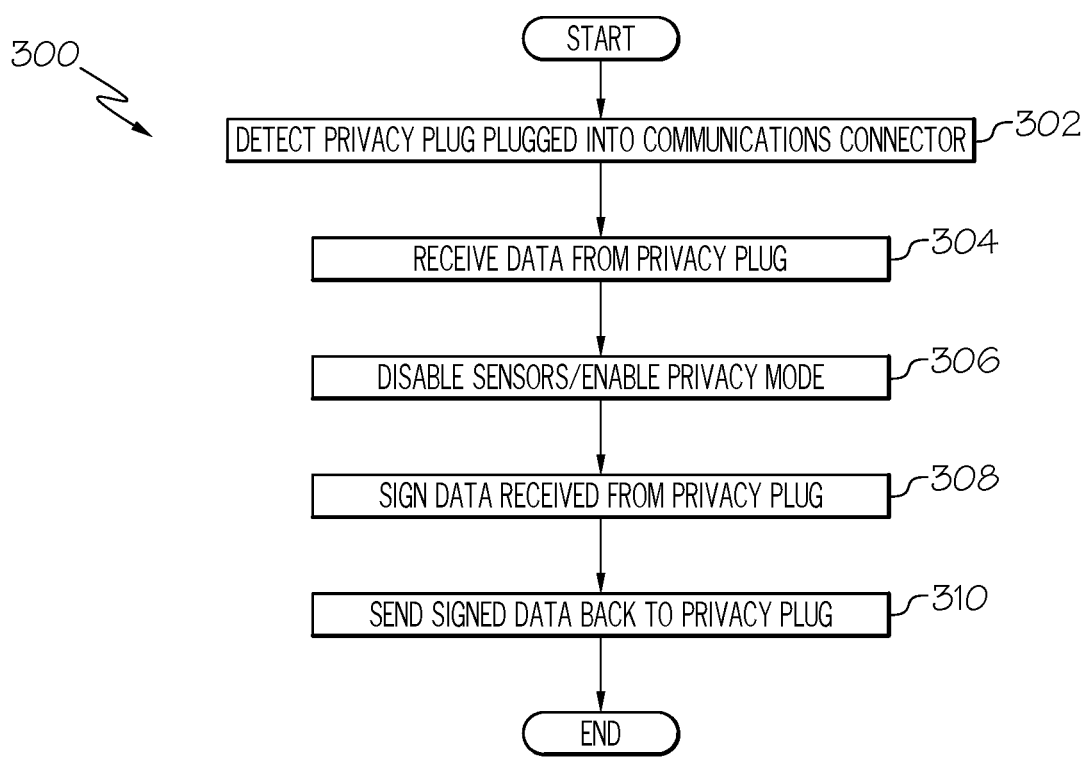
FIG. 3 illustrates a device privacy plug insertion process, according to an example.

FIG. 3 illustrates a device privacy plug insertion process 300, according to an example. The device privacy plug insertion process 300 is an example of a process performed at least in part by the privacy mode controller 140 when a privacy plug is plugged into a headphone jack 122, or other audio jack, of the electronic device with privacy mode 100. The device privacy plug insertion process 300 is also able to be performed based on certain devices being plugged into any communications connection when the inserted device supports the verification processing of a privacy plug as is described below.

The device privacy plug insertion process 300 begins by detecting that a privacy plug is plugged into a communications connector. Various techniques for detecting that a privacy plug is plugged into an audio jack or communications port, such as a USB port, are described above. Once a privacy plug is inserted into an audio jack or other communications connector, the design of the electronic device performing the device privacy plug insertion process 300 allows the privacy plug to communicate with the privacy mode controller 140 to exchange data to support this process.

Data is then received, at 304, from the privacy plug. In an example, the privacy plug sends this data in response to any suitable trigger, such as detecting insertion into the communications connector, polling by the privacy mode controller 140, any other trigger, or combinations of these. In an example, the privacy plug sends data that has a random value generated by a processor within the privacy plug. Such random data is able to be referred to as a nonce since it is to be used within a relatively short time duration after it is received.

Based on receiving the data from the privacy plug, the sensors are disabled and privacy mode is enabled, at 306. Enabling privacy mode in an example is able to cause various operations to be performed, such as providing indications to various software components or user interfaces on the electronic device intended to be in privacy mode.

The data that was received from the privacy plug is electronically signed, at 308. In an example, a cryptographic electronic signature is able to be made based upon a private key stored in the electronic device, such as in the certificate storage 152 of the trusted execution environment 104 described above. The signed data is sent, at 310, back to the privacy plug and the device privacy plug insertion process 300 ends.

Figure 4:
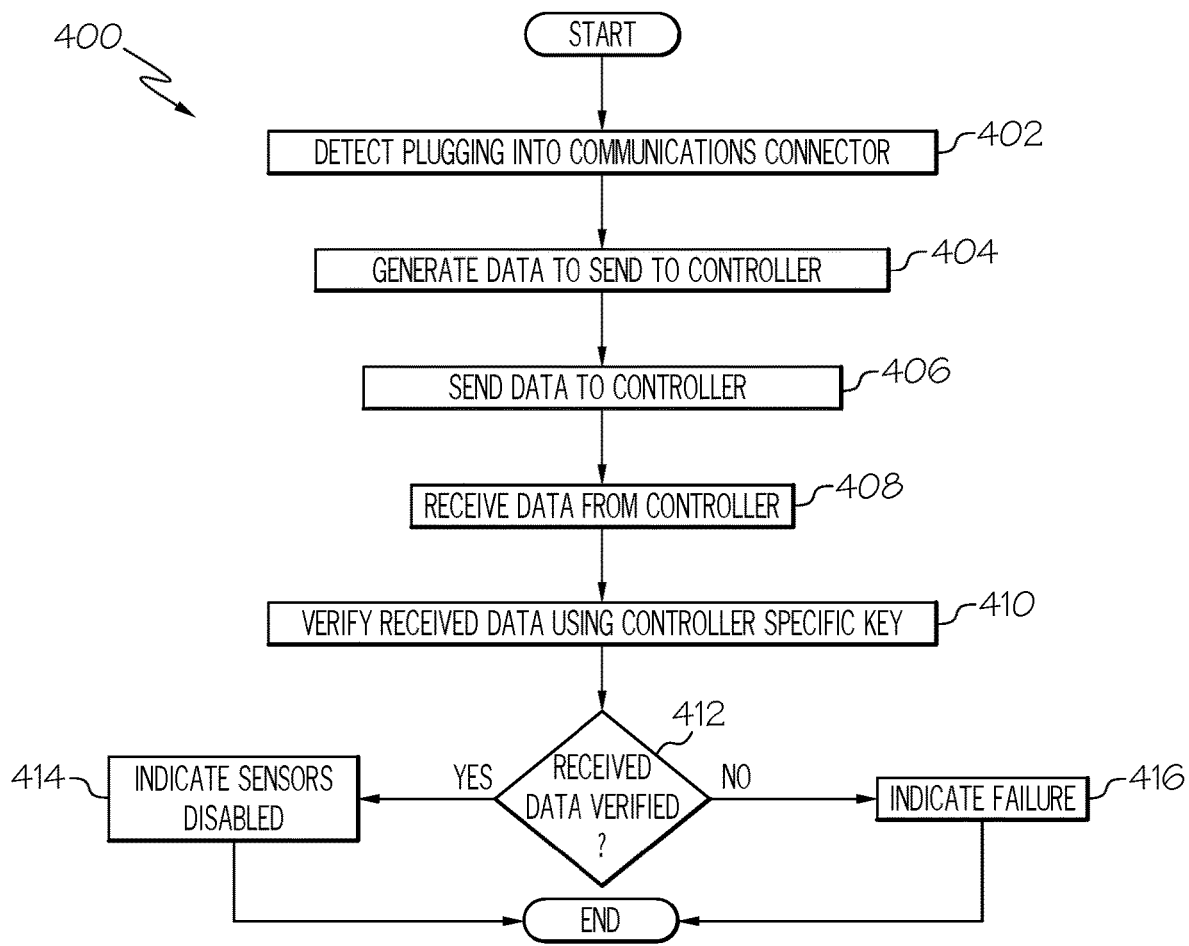
FIG. 4 illustrates a privacy plug insertion process, according to an example.

FIG. 4 illustrates a privacy plug insertion process 400, according to an example. The privacy plug insertion process 400 in an example is performed by a processor that is within a privacy plug device.

The privacy plug insertion process 400 begins by detecting, at 402, that the privacy plug is plugged into a communications connector. This detection may be based on power being detected through the communications connector, such as a microphone bias voltage received through an audio plug, other techniques, or a combination of these.

Data is generated, at 402, to send to the controller. In an example, a random value, known as a nonce, is generated as this data. In an example, this data is to be sent to the privacy mode controller 140 as is described above. This data is sent, at 406, to the controller.

Data is then received, at 408, from the controller. In an example, this received data is a verification that the privacy mode of the electronic device into which the privacy plug was inserted has been enabled.

The data received from the controller is verified, at 410, by using a controller specific key. In an example, each privacy plug is able to be configured to store a key that is associated with a particular electronic device. In an example, this key is the public key that corresponds to a private key that is stored in the trusted execution environment of the electronic device and that is used to sign the nonce data that is returned to the privacy plug at 408. In general, any key that is able to authenticate that the received data was signed by a process within the trusted execution environment 104 of the electronic device can be used to verify the data received from the controller. In various examples, any technique is able to be used to configure the privacy plug with the public key of the electronic device.

If the verification of the received data is true, an indication is provided, at 414, that the sensors have been disabled. This also indicates that the privacy mode of the device has been enabled. This indication is able to be, for example, illumination or flashing of a green LED.

If the verification is false, then a failure is indicated, at 416. Verification can be determined to be false in some examples by not receiving any response, not receiving a valid response, or both, within a particular time after sending the data, at 406. The indication of Failure is able to include, for example, illuminating or flashing a red LED.

Figure 5:
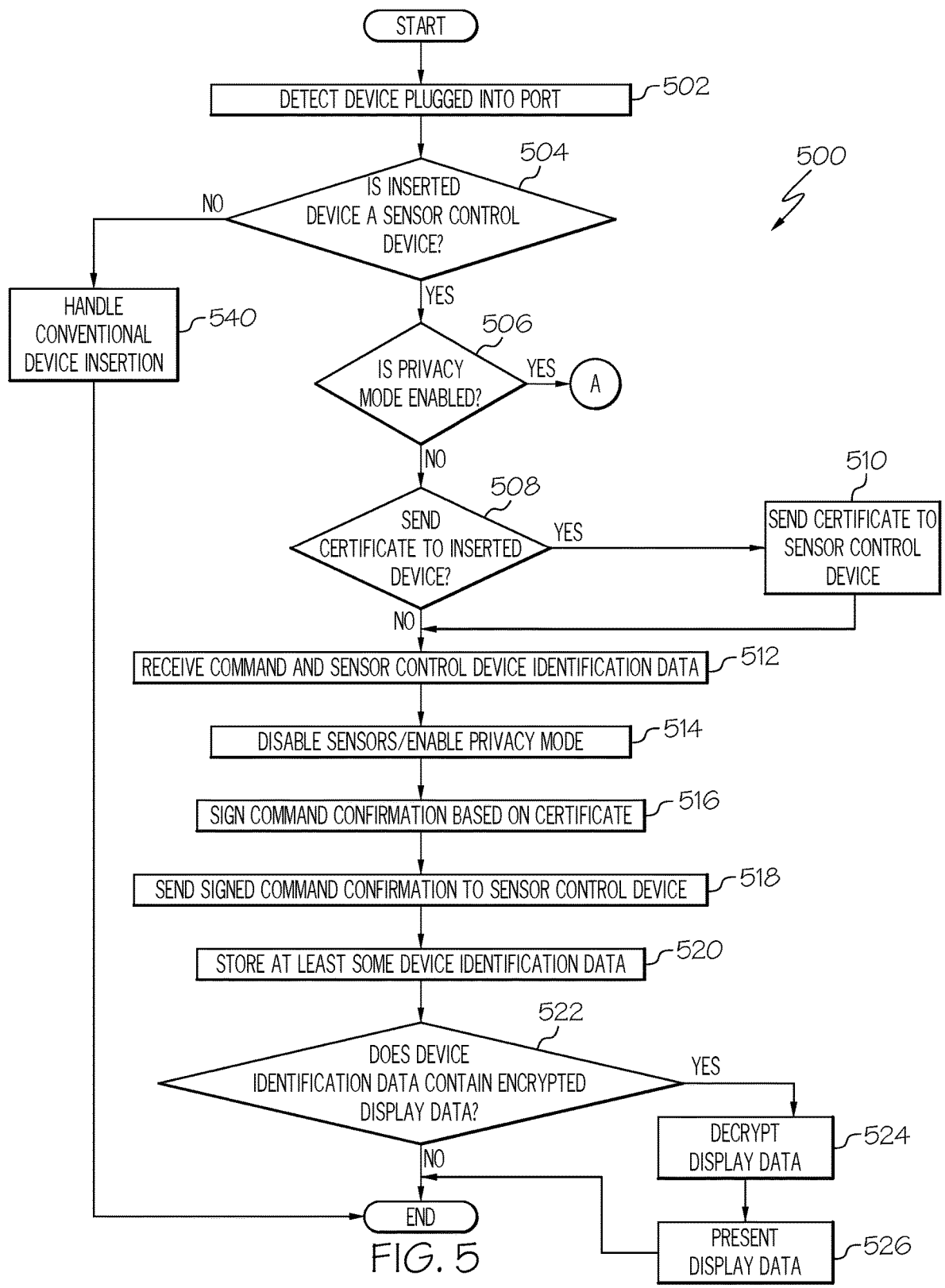
FIG. 5 illustrates a device sensor control device insertion process, according to an example.

FIG. 5 illustrates a device sensor control device insertion process 500, according to an example. The device sensor control device insertion process 500 is an example of a process performed at least in part by the privacy mode controller 140 when a sensor control device is plugged into a communications connection, such as a USB port. In an example, the device sensor control device insertion process 500 is performed when the inserted privacy device supports the verification processing that is described below.

The device sensor control device insertion process 500 begins by detecting, at 502, if a device is plugged into a port, such as a USB port that is a communications connector. The USB drivers of various hardware automatically detect the insertion of a device into a USB port and triggers processing based on that detection. In an example, the USB protocol allows identification of the type of device that is plugged into a USB port. This identification is able to identify sensor control devices and control processing to proceed base on that identification.

A determination is made, at 504, if the inserted device is a sensor control device. This determination is made based on the identification determined by the USB protocol described above, in an example. If it is determined that the inserted device is not a sensor control device, the inserted device is handled conventionally, at 540. In an example, the above described processing for the device sensor control device insertion process 500 is performed by the communications drivers 160 of the general operating system 106 described above.

Returning to the determination at 504, if it is determined that the inserted device is a sensor control device, a determination is made, at 506, if privacy mode is enabled. In an example, the determination that the inserted device is a sensor control device causes the communications driver to create a channel from the sensor control device, through the protected communications interface 114, to the privacy mode controller 140 within the trusted execution environment 104. In this example, the determination as to whether privacy mode is enabled is performed by the privacy mode controller 140. In an example, the privacy mode controller 140 is able to authenticate data from the sensor control device 190.

If it is determined that privacy mode is enabled, processing continues with the privacy mode disable process 600, as is indicted by the "A" in FIG. 5 and as is described in detail below. If it is determined that privacy mode is not enabled, a determination is made, at 508, as to whether to send a certificate to the inserted device. In an example, certain types of sensor control devices are able to send encrypted data to support verification processing described below. This certificate is generally able to be used for various purposes by the inserted sensor control device. In an example, the certificate further includes a public key that is used by the sensor control device to encrypt data for verification purposes as is described below.

If it is determined to send a certificate, the certificate is sent, at 510, to the inserted sensor control device. In general, communications between the privacy mode controller 140 of the trusted execution environment 104 and a device inserted into a communications connector, such as a USB port 120, is performed through the protected communications interface 114 with the communications drivers of the general operating system 106.

A command and sensor control device identification data are received, at 512. In general, the command is a command to enable privacy mode in the electronic device. In some examples, the command may also specify which peripherals, such as particular sensors including a microphone and camera, are to be disabled. The identification data is able to be any suitable data to identify the sensor control device. In some examples, the identification data is able to include one or more certificates that are part of a change to a trusted root Certificate Authority (CA). In further examples, the identification data is able to include a public key that corresponds to a private key used by the sensor control device. In some examples, the device identification data is further able to include data to be displayed on the electronic device in order to verify that the privacy mode is being enabled on the intended device.

The sensors are disabled and the privacy mode is enabled, at 514. Enabling the privacy mode in an example controls various processing, such as the determination described above at 506 as to whether to proceed with the device sensor control device insertion process 500 or perform the privacy mode disable process 600 as is described below.

A confirmation that the received command has been successfully executed is signed, at 516, based on a certificate. The signing of this confirmation message is an example of generating a validated confirmation message. In an example, the confirmation is signed based on a certificate stored within the trusted execution environment 104. In various examples, any technique is able to be used to provide a desired level of authentication of the confirmation, such as encryption by a particular private key whose corresponding public key is stored in the sensor control device.

The signed command confirmation is sent, at 518, to the sensor control device. This is an example of sending, via the data communications connector, the validated confirmation. At least some of the identification data that was received, as described above at 512, from the sensor control device is stored, at 520. This identification data is used in some examples, as described below, to restrict processing of commands to disable privacy mode to those that originate only from the device that sent the command to enable the privacy mode. In further examples, the signed command is able to be authenticated by any suitable technique. In an example, an electronic device is able to be configured to only respond to commands that are associated with certificates that are able to be verified as belonging to certificate chains associated with a particular organization that is authorized to enable, disable, modify, or otherwise command privacy mode related features of an electronic device.

A determination is made, at 522, as to whether the identification data received from the sensor control device includes encrypted display data. In an example, the display data is encrypted by the sensor control device based on the certificate sent to the sensor control device as described above at 510. In some examples, the sensor control device will contain display data that is to be presented on the display of the electronic device into which the sensor control device is inserted. Because the communications between the privacy mode controller 140 in the trusted execution environment 104 is routed through the communications drivers 160 of the general operating system 106, the communications drivers 160 may be subject to unauthorized modifications. Such modified communications drivers 160 may interfere with the communications between the sensor control device 190 and the privacy mode controller 140 in a manner that allows the sensor control device 190 to receive indications that the privacy mode of the device has been enabled when in fact it has not.

If it is determined that the identification data contains encrypted display data, the display data is decrypted, at 524. The decrypted display data is presented, at 526. In an example, the privacy mode controller 140 decrypts the encrypted display data and sends the decrypted display data to the user interface processing 150. The user interface processing 150 sends the data to be presented to the user interface driver 162 of the general operating system 106 through a protected UI interface 116.

After presenting the display data, at 526, or determining that the device identification data does not contain encrypted display data, at 522, the device sensor control device insertion process 500 ends.

Figure 6:
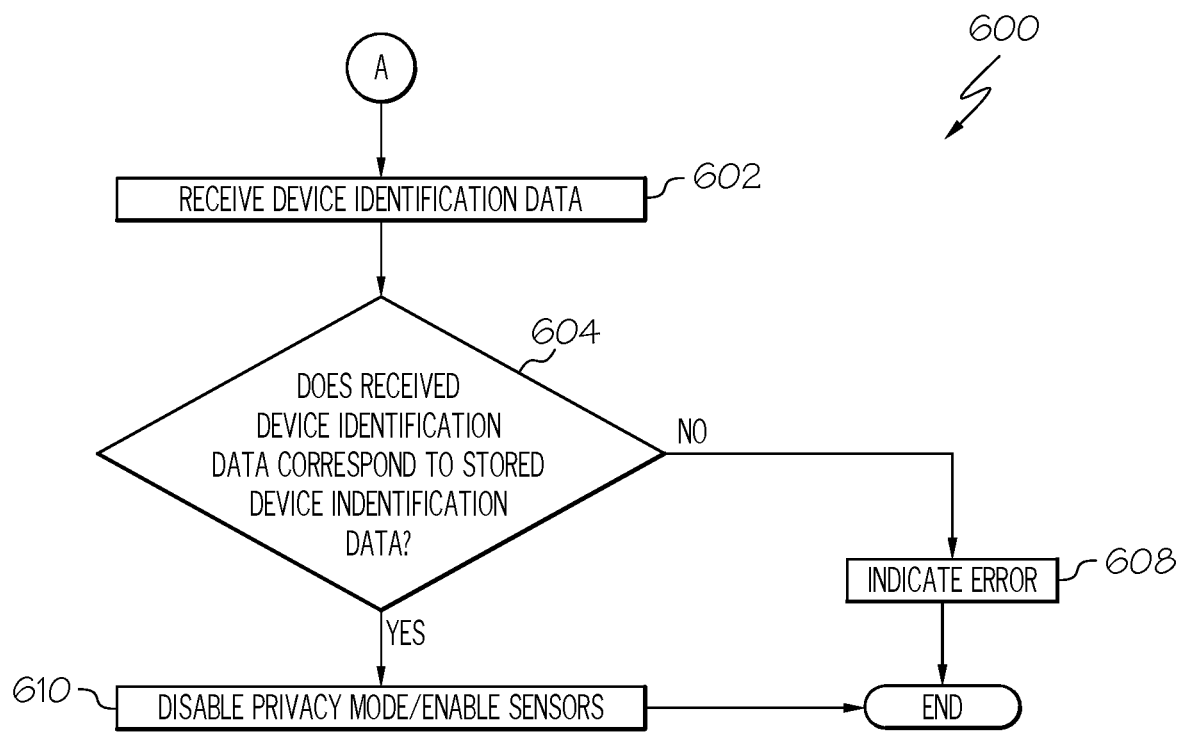
FIG. 6 is a privacy mode disable process, according to an example.

FIG. 6 is a privacy mode disable process 600, according to an example. The privacy mode disable process 600 is performed when a determination is made, at 506 as part of the device sensor control device insertion process 500 described above, that the privacy mode of an electronic device is already enabled when a sensor control device is inserted into a communications connector. The privacy mode disable process 600 is the continuation of the indicator "A" in the device sensor control device insertion process 500. The privacy mode disable process 600 begins after a device is detected, at 502, the detected device is determined to be a sensor control device, at 504, and the privacy mode of the electronic device has been enabled by prior execution of the device sensor control device insertion process 500.

The privacy mode disable process 600 receives device identification data, 602. In an example, this device identification data is a subsequent privacy mode command because it is received subsequent to the privacy mode enable indicator that enabled the privacy mode on this electronic device. This device identification data is received from the sensor control device and, in an example, is a cryptographic certificate that uniquely identifies the sensor control device, a public key corresponding to a private key used by the sensor control device, any suitable data, or combinations of these. In an example, the sensor control device also sends a command to disable the privacy mode on the electronic device.

A determination is made, at 604, if the received device identification data corresponds to stored device identification data. In an example, when the privacy mode of the electronic device is last enabled by a sensor control device, identification data for that sensor control device is stored, such as at 520 described above. In further examples, any suitable identification is able to be used. In one example, this identification of sensor control device is able to be based on receiving the same public key from the sensor control device as was received with the previously processed request to enable the privacy mode.

If the received identification is determined to correspond to the stored identification data, the privacy mode is disabled, and the electronic device's sensors are enabled, at 610. If the received identification is not determined to correspond to the stored identification data, an error is indicated, at 608. The privacy mode disable process 600 then ends.

Figure 8:
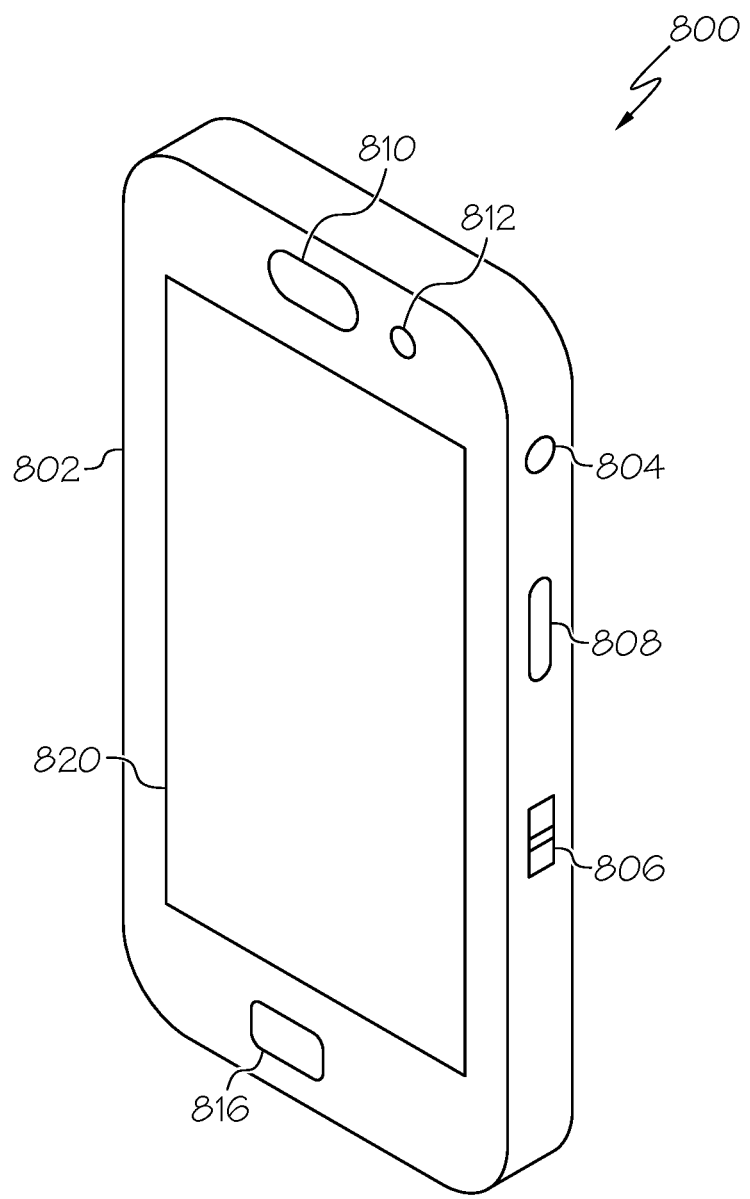
FIG. 8 illustrates a device case view, according to an example.

FIG. 8 illustrates a device case view 800, according to an example. The device case view 800 depicts a perspective view of a case 802 of an electronic device that supports the above described privacy modes.

The device case view 800 depicts a case 802 that has a hardware switch 806 that is an example of the above described hardware switch 110 described in conjunction with the electronic device with privacy mode 100. As described above, the hardware switch 806 is able to enable or disable privacy modes of electronic device.

The case 802 in this example also includes a USB port 808. The USB port 808 is an example of the USB port 120 discussed above. As discussed above, a Sensor Control Device 190 is able to be inserted into the USB port 808 in order to enable or disable privacy mode for the device contained in the case 802. The case 802 also includes a headphone jack 804 that is an example of the headphone jack 122 described above. As described above, a privacy plug is able to be plugged into the headphone jack 804 in order to enable a privacy mode of the device.

The case 802 in an example houses of a smartphone that has a microphone 816 and earpiece speaker 810 to facilitate voice communications. The illustrated electronic device also has a camera 812. In an example, the privacy mode of a device is able to modify the operation of these components, such as by disabling them.

The case 802 also houses a display 820 that allows visual information to be presented to a user of the electronic device. In an example, the display 820 supports presenting text, graphics, images, other visual presentations, or combinations of these. The display 820 in an example is able to present graphical user interface elements to allow a user to receive information from the electronic device. In some examples, the display 820 includes a touch sensitive surface that allows a user to interact with a graphical user interface and provide input selections to the electronic device.

Figure 7:
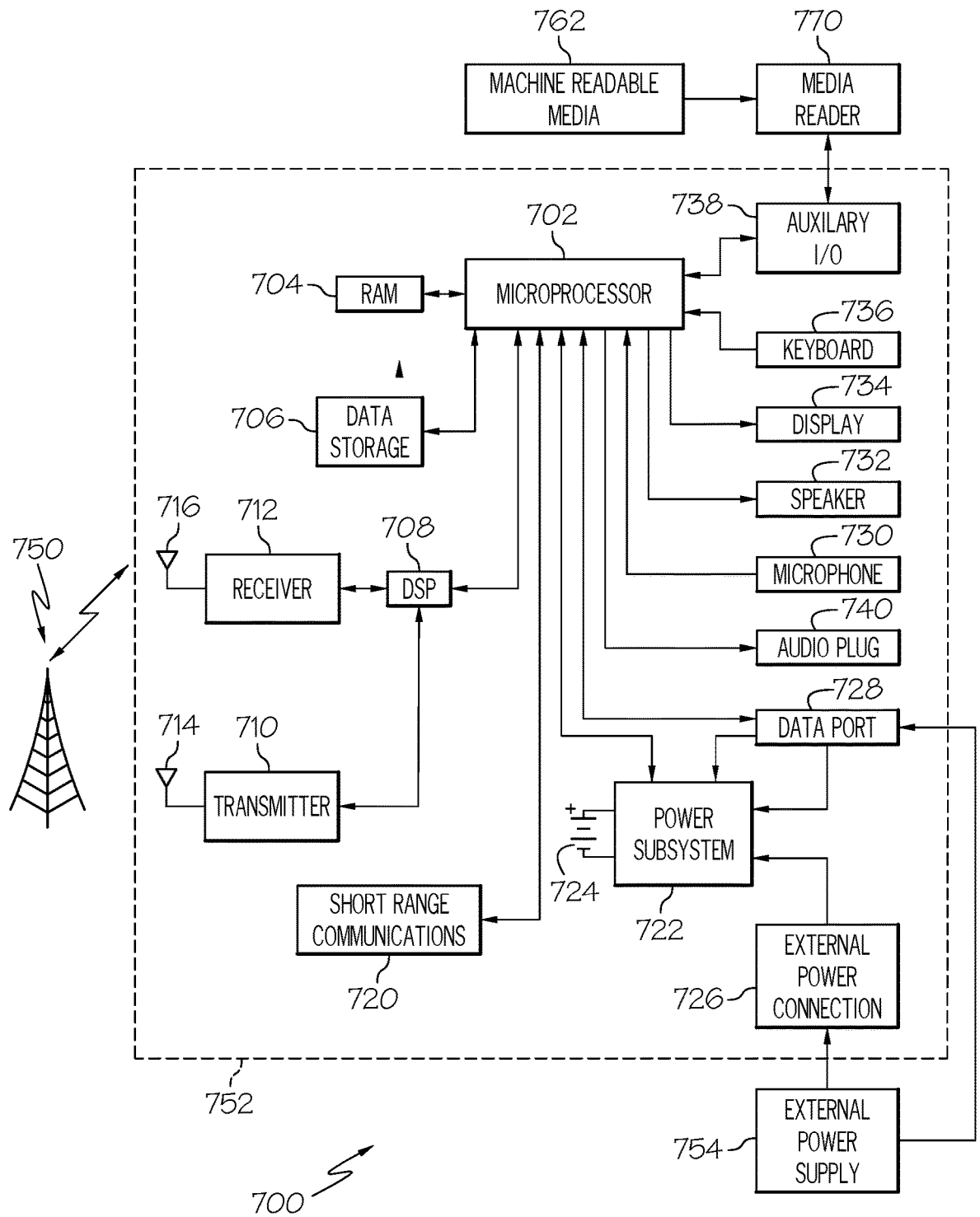
FIG. 7 is a block diagram of an electronic device and associated components in which the systems and methods disclosed herein may be implemented.

FIG. 7 is a block diagram of an electronic device 752 and associated components 700 in which the systems and methods disclosed herein may be implemented. In various examples, the electronic device 752 is able to be an example of the above described electronic device with privacy mode 100. In some examples, electronic devices support data communications without supporting voice communications. For example, some electronic devices support data communications via a local data communications network, such as a WiFi® network. In some examples, devices may support voice communications via various techniques, such as Voice over Internet Protocol (VoIP), using systems such as BlackBerry Messenger® Voice, other voice over data systems, or combinations of these. Such electronic devices communicate with a wireless voice, text chat, or data network 750 using a suitable wireless communications protocol. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with text and data messaging capabilities, a wireless Internet appliance or a data communication device that may or may not include telephony capabilities.

The illustrated electronic device 752 is an example electronic device that includes two-way wireless communications functions. Such electronic devices incorporate communication system elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication system is dependent upon the communication network and associated wireless communications protocols with which the device is intended to operate.

The electronic device 752 includes a microprocessor 702 that controls the overall operation of the electronic device 752. The above described processor 102 is an example of the microprocessor 702. The microprocessor 702 interacts with the above described communications system elements and also interacts with other device systems. In various examples, the electronic device 752 is able to include one or more of various components such as a data storage 706, random access memory (RAM) 704, auxiliary input/output (I/O) device 738, data port 728, display 734, keyboard 736, earpiece 732, media reader 770, microphone 730, a short-range communications system 720, a power system 722, an audio plug 740, other systems, or combinations of these.

One or more power storage or supply elements, such as a battery 724, are connected to a power system 722 to provide power to the circuits of the electronic device 752. The power system 722 includes power distribution circuitry for providing power to the electronic device 752 and also contains battery charging circuitry to manage recharging the battery 724 (or circuitry to replenish power to another power storage element). The power system 722 receives electrical power from external power supply 754. The power system 722 is able to be connected to the external power supply 754 through a dedicated external power connector (not shown) or through power connections within the data port 728. The power system 722 includes a battery monitoring circuit that is operable to provide a status of one or more battery status indicators, such as remaining capacity, temperature, voltage, electrical current consumption, and the like, to various components of the electronic device 752.

The data port 728 is able to support data communications between the electronic device 752 and other devices through various modes of data communications, such as high speed data transfers over optical communications circuits. Data port 728 is able to support communications with, for example, an external computer or other device. In some examples, the data port 728 is able to include electrical power connections to provide externally provided electrical power to the electronic device 752, deliver electrical power from the electronic device 752 to other externally connected devices, or both. Data port 728 of, for example, an electronic accessory is able to provide power to an electronic circuit, such as microprocessor 702, and support exchanging data between the microprocessor 702 and a remote electronic device that is connected through the data port 728.

Data communication through data port 728 enables a user to set preferences through the external device or through a software application and extends the capabilities of the device by enabling information or software exchange through direct connections between the electronic device 752 and external data sources rather than via a wireless data communication network. In addition to data communication, the data port 728 provides power to the power system 722 to charge the battery 724 or to supply power to the electronic circuits, such as microprocessor 702, of the electronic device 752.

Operating system software used by the microprocessor 702 is stored in data storage 706. Examples of data storage 706 are able to include, for example, flash memory, magnetic based storage devices, other volatile or non-volatile data store elements, or the like. Some examples are able to use data storage 706 that includes a battery backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A set of applications that control basic device operations, including at least data and voice communication applications, is able to be installed on the electronic device 752 during manufacture. In an example, programs and other data used to support the processes described above are able to be installed in the memory of the electronic device 752. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 752 through, for example, the wireless network 750, an auxiliary I/O device 738, Data port 728, short-range communications system 720, or any combination of these interfaces. Such applications are then able to be installed by a user in the RAM 704 or a non-volatile store for execution by the microprocessor 702.

In a data communication mode, a received signal such as a text message or web page download is processed by the communication system, including wireless receiver 712 and wireless transmitter 710, and communicated data is provided the microprocessor 702, which is able to further process the received data. In some examples, the electronic device 752 includes a display, output ports, or combinations of these. In such examples, the received data is able to be processed for output to the display 734, or alternatively, to an auxiliary I/O device 738 or the Data port 728. In examples of the electronic device 752 that include a keyboard 736 or other similar input facilities, a user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication system.

For voice communications, overall operation of the electronic device 752 is substantially similar, except that received signals are generally provided to an earpiece 732 and signals for transmission are generally produced by a microphone 730. Alternative voice or audio I/O systems, such as a voice message recording system, may also be implemented on the electronic device 752. Although voice or audio signal output is generally accomplished primarily through the earpiece 732, in examples of electronic devices 752 that include a display 734, the display 734 may also be used to provide an indication of the identity of a calling party, the duration of a voice call, or other voice call related information, for example.

The audio plug 740 is able to implement the headphone jack 122 and its associated functions are discussed above. The data port 728 is also able to implement the USB port 120 and its associated functions as are discussed above. For example, one or both of these interfaces are able to receive and support interaction with any suitable privacy device to implement a privacy mode of the electronic device 752.

Depending on conditions or statuses of the electronic device 752, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 720 provides for data communication between the electronic device 752 and different systems or devices, which need not necessarily be similar devices. For example, the short-range communications system 720 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as WiFi®, Near Field Communications (NFC), any other short range link, or combinations of these A media reader 770 is able to be connected to an auxiliary I/O device 738 to allow, for example, loading computer readable program code of a computer program product into the electronic device 752 for storage into flash memory 706. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the Data port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises some or all the features enabling the implementation of some or all of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Furthermore, the computer readable medium may comprise computer readable information in a transitory state medium such as a network link and/or a network interface, including a wired network or a wireless network, that allow a computer to read such computer readable information.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A privacy mode control apparatus, comprising:
   a peripheral control circuit comprising a peripheral enablement control interface settable between an enabled state and a disabled state,
   the peripheral control circuit configured to:
      disable an associated peripheral from providing signals to processing circuits based on the peripheral enablement control interface being in the disabled state; and
      enable the associated peripheral to provide signals to processing circuits based on the peripheral enablement control interface being in the enabled state;
   a processor configured to maintain a trusted execution environment and a general operating system that has restricted access to the trusted execution environment; and
   a data communications connector, communicatively coupled to the trusted execution environment, configured to receive a privacy device and to exchange data with the privacy device, the peripheral enablement control interface being communicatively coupled to the trusted execution environment and otherwise communicatively isolated from the general operating system, and the trusted execution environment being configured to:
establish a communications session with the privacy device via the data communications connector;
receive, from the privacy device, a privacy mode enable indicator having a state indicating either one of a first value and a second value;
set the peripheral enablement control interface to a disabled state based on the state of the privacy mode enable indicator indicting the first value; and
set the peripheral enablement control interface to an enabled state based on the state of the privacy mode enable indicator indicating the second value.

2. The privacy mode control apparatus of claim 1, wherein the associated peripheral comprises at least one microphone or camera, and the peripheral control circuit disables the associated peripheral by at least removing power from at least a portion of the associated peripheral.

3. The privacy mode control apparatus of claim 1, further comprising a physical switch communicatively coupled to the trusted execution environment and otherwise communicatively isolated from the general operating system, the physical switch providing the privacy mode enable indicator to the trusted execution environment, the physical switch comprising a first position and a second position,
the privacy mode enable indicator having the first value based on the physical switch being in the first position, and
the privacy mode enable indicator having the second value based on the physical switch being in the second position.

4. The privacy mode control apparatus of claim 1, wherein the trusted execution environment is further configured to:
receive, from the privacy device, a device identification data;
generate, based on the device identification data, a validated confirmation of the privacy mode enable indicator; and
send the validated confirmation.

5. The privacy mode control apparatus of claim 1, the data communications connector comprising at least one audio connector, and
the communications session being established over audio communications lines of the audio connector.

6. The privacy mode control apparatus of claim 1, the data communications connector comprising a Universal Serial Bus (USB) connector.

7. The privacy mode control apparatus of claim 1, the trusted execution environment being further configured to send controller identification data to the privacy device via the data communications connector.

8. The privacy mode control apparatus of claim 4, the trusted execution environment being further configured to:
store at least part of the device identification data;
receive, subsequent to receipt of the privacy mode enable indicator, a privacy mode command;
verify the privacy mode command based on the device identification data;
maintain, based on failing to verify the privacy mode command, the peripheral enablement control interface in the disabled state; and
set, based on verifying the privacy mode command, the peripheral enablement control interface to the enabled state.

9. The privacy mode control apparatus of claim 4,
where the trusted execution environment being further configured to:
send controller identification data to the privacy device via the data communications connector;
decrypt the encrypted data based on the controller identification data to obtain the validation data; and
display a representation of the validation data, and
where the device identification data comprising encrypted data, the encrypted data comprising validation data that is encrypted based on the controller identification data.

10. The privacy mode control apparatus of claim 9, wherein the controller identification data comprises at least one of image data or alphanumeric data.

11. A method comprising:
maintaining, within a processor, a trusted execution environment and a general operating system that has restricted access to the trusted execution environment,
establishing a communications session with a privacy device via a data communications connector;
receiving, from the privacy device, a privacy mode enable indicator having a state indicating either one of a first value and a second value;
setting a peripheral enablement control interface to a disabled state based on the state of the privacy mode enable indicator indicting the first value; and
setting the peripheral enablement control interface to an enabled state based on the state of the privacy mode enable indicator indicating the second value,
the peripheral enablement control interface being communicatively coupled to the trusted execution environment and otherwise communicatively isolated from the general operating system, and
disabling an associated peripheral from providing signals to processing circuits when in the disabled state; and
enabling the associated peripheral to provide signals to processing circuits when in the enabled state.

12. The method of claim 11, wherein the associated peripheral comprises at least one microphone or camera, and the associated peripheral is disabled by at least one of asserting a reset of, de-asserting an enable of, revoking access to, or removing power from at least a portion of the associated peripheral.

13. The method of claim 11, wherein receiving the privacy mode enable indicator is based upon a position of a physical switch that is communicatively coupled to the trusted execution environment and otherwise communicatively isolated from the general operating system, being in one of a first position and a second position,
the privacy mode enable indicator having the first value based on the physical switch being in the first position, and
the privacy mode enable indicator having the second value based on the physical switch being in the second position.

14. The method of claim 11, further comprising:
receiving, from the privacy device, a device identification data;
generating, based on the device identification data, a validated confirmation of the privacy mode enable indicator; and
sending the validated confirmation.

15. The method of claim 14, further comprising:
sending controller identification data to the privacy device;
storing at least part of the device identification data;

receiving, subsequent to receipt of the privacy mode enable indicator indicating the first value, a privacy mode command indicating the second value;

verifying the privacy mode command based on the device identification data;

maintaining, based on failing to verify the privacy mode command, the peripheral enablement control interface in the disabled state; and setting, based verifying the privacy mode command, the peripheral enablement control interface to the enabled state.

16. The method of claim 14, the device identification data comprising encrypted data, the encrypted data comprising validation data that is encrypted based on controller identification data, the method further comprising:

sending the controller identification data to the privacy device;

decrypting the encrypted data based on the controller identification data to obtain the validation data; and displaying a representation of the validation data.

17. A computer readable storage medium having computer readable program code embodied therewith, the computer readable program code comprising instructions executable by a processor to:

maintain a trusted execution environment and a general operating system that has restricted access to the trusted execution environment, establish a communications session with a privacy device via a data communications connector;

receive, from the privacy device, a privacy mode enable indicator having a state indicating either one of a first value and a second value;

set a peripheral enablement control interface to a disabled state based on the state of the privacy mode enable indicator indicting the first value; and set the peripheral enablement control interface to an enabled state based on the state of the privacy mode enable indicator indicating the second value, the peripheral enablement control interface being communicatively coupled to the trusted execution environment and otherwise communicatively isolated from the general operating system, and disable an associated peripheral from providing signals to processing circuits when in the disabled state; and enable the associated peripheral to provide signals to processing circuits when in the enabled state.

18. The computer readable storage medium of claim 17, wherein the computer readable program code further comprises instructions executable by the processor to:

receive, from the privacy device, a device identification data;

generate, based on the device identification data, a validated confirmation of the privacy mode enable indicator; and send the validated confirmation.

\* \* \* \* \*